United States Patent
Lu et al.

(10) Patent No.: US 9,368,136 B2
(45) Date of Patent: Jun. 14, 2016

(54) MAGNETORESISTIVE SENSOR HAVING SYNTHETIC ANTIFERROMAGNETIC LAYER IN TOP AND BOTTOM SHIELDS

(71) Applicant: Seagate Technology LLC, Cupertino, CA (US)

(72) Inventors: Zhengqi Lu, Londonderry (GB); Daniel Hassett, Newtown Cunningham (IE); Paula McElhinney, Derry (GB); Jiansheng Xu, Londonderry (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/192,388

(22) Filed: Feb. 27, 2014

(65) Prior Publication Data

US 2015/0243307 A1    Aug. 27, 2015

(51) Int. Cl.
*G11B 5/115* (2006.01)
*G11B 5/39* (2006.01)

(52) U.S. Cl.
CPC .............. *G11B 5/3912* (2013.01); *G11B 5/115* (2013.01); *G11B 5/3909* (2013.01); *G11B 2005/3996* (2013.01)

(58) Field of Classification Search
CPC .............................. G11B 5/115; G11B 5/3912
USPC ........................................................ 360/319
See application file for complete search history.

(56) References Cited

U.S. PATENT DOCUMENTS

| 7,606,007 | B2 * | 10/2009 | Gill | 360/319 |
| 7,630,068 | B2 * | 12/2009 | Tanaka et al. | 356/237.1 |
| 8,638,530 | B1 * | 1/2014 | Hsu et al. | 360/319 |
| 8,755,152 | B1 * | 6/2014 | Park | G01R 33/093 360/319 |
| 8,760,820 | B1 * | 6/2014 | McKinlay et al. | 360/319 |
| 8,780,505 | B1 * | 7/2014 | Xiao | 360/319 |
| 8,797,692 | B1 * | 8/2014 | Guo et al. | 360/319 |
| 2006/0158792 | A1 * | 7/2006 | Gill | 360/324.11 |
| 2007/0195467 | A1 * | 8/2007 | Gill | 360/319 |
| 2009/0279213 | A1 * | 11/2009 | Wu et al. | 360/319 |
| 2010/0079917 | A1 * | 4/2010 | Miyauchi et al. | 360/319 |
| 2012/0281319 | A1 * | 11/2012 | Singleton et al. | 360/319 |
| 2014/0104729 | A1 * | 4/2014 | Singleton et al. | 360/319 |

OTHER PUBLICATIONS

U.S. Appl. No. 13/761,216, filed Feb. 7, 2013, entitled "Data Reader with Magnetic Seed Lamination."

* cited by examiner

*Primary Examiner* — Adam B Dravininkas
(74) *Attorney, Agent, or Firm* — HolzerIPLaw, PC

(57) ABSTRACT

In accordance with one implementation of the described technology, an apparatus comprises a sensor structure including a top shield which includes a top shield synthetic antiferromagnetic layer and a bottom shield including a bottom shield synthetic antiferromagnetic layer, wherein the bottom synthetic antiferromagnetic shield layer acts as a seed layer structure.

17 Claims, 7 Drawing Sheets

US 9,368,136 B2

MAGNETORESISTIVE SENSOR HAVING SYNTHETIC ANTIFERROMAGNETIC LAYER IN TOP AND BOTTOM SHIELDS

BACKGROUND

Magnetic hard disc drives include transducer heads that read and write data encoded in tangible magnetic storage media. Magnetic flux detected from the surface of the magnetic medium causes rotation of a magnetization vector of a sensing layer or layers within a magnetoresistive (MR) sensor within the transducer head, which in turn causes a change in electrical resistivity of the MR sensor. The change in resistance of the MR sensor can be detected by passing a current through the MR sensor and measuring the voltage change across the MR sensor. Related circuitry can convert the measured voltage change information into an appropriate format and manipulate that information to recover the data encoded on the disc.

SUMMARY

Implementations described and claimed herein provide an apparatus comprising a sensor structure including a top shield including a top shield synthetic antiferromagnetic (SAF) layer and a bottom shield including a bottom shield SAF layer. The top shield SAF may be ex situ, and the bottom shield SAF layer may be in situ.

This Summary is provided to introduce an election of concepts in a simplified form that are further described below in the Detailed Description. This Summary is not intended to identify key features or essential features of the claimed subject matter, nor is it intended to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTION OF THE DRAWINGS

FIG. 2a illustrates a layer diagram of an example ex situ type-1 top SAF shield.

FIG. 2b illustrates an example of the ex situ type-1 top SAF shield in FIG. 2a.

FIG. 3a illustrates a layer diagram of an example ex situ type-2 enhanced top SAF shield.

FIG. 3b illustrates an example of the ex situ type-2 enhanced top SAF shield in FIG. 3a.

FIG. 4a illustrates a layer diagram of an example in situ type-1 bottom SAF shield.

FIG. 4b illustrates an example of the in situ type-1 bottom SAF shield in FIG. 4a.

FIG. 5a illustrates a layer diagram of an example in situ type-2 enhanced bottom SAF shield.

FIG. 5b illustrates an example of the in situ type-2 enhanced bottom SAF shield in FIG. 5a.

FIG. 6a illustrates a layer diagram of an example in situ type-3 bottom SAF shield.

FIG. 6b illustrates an example of the in situ type-3 bottom SAF shield in FIG. 6a.

DETAILED DESCRIPTION

Figure 1:
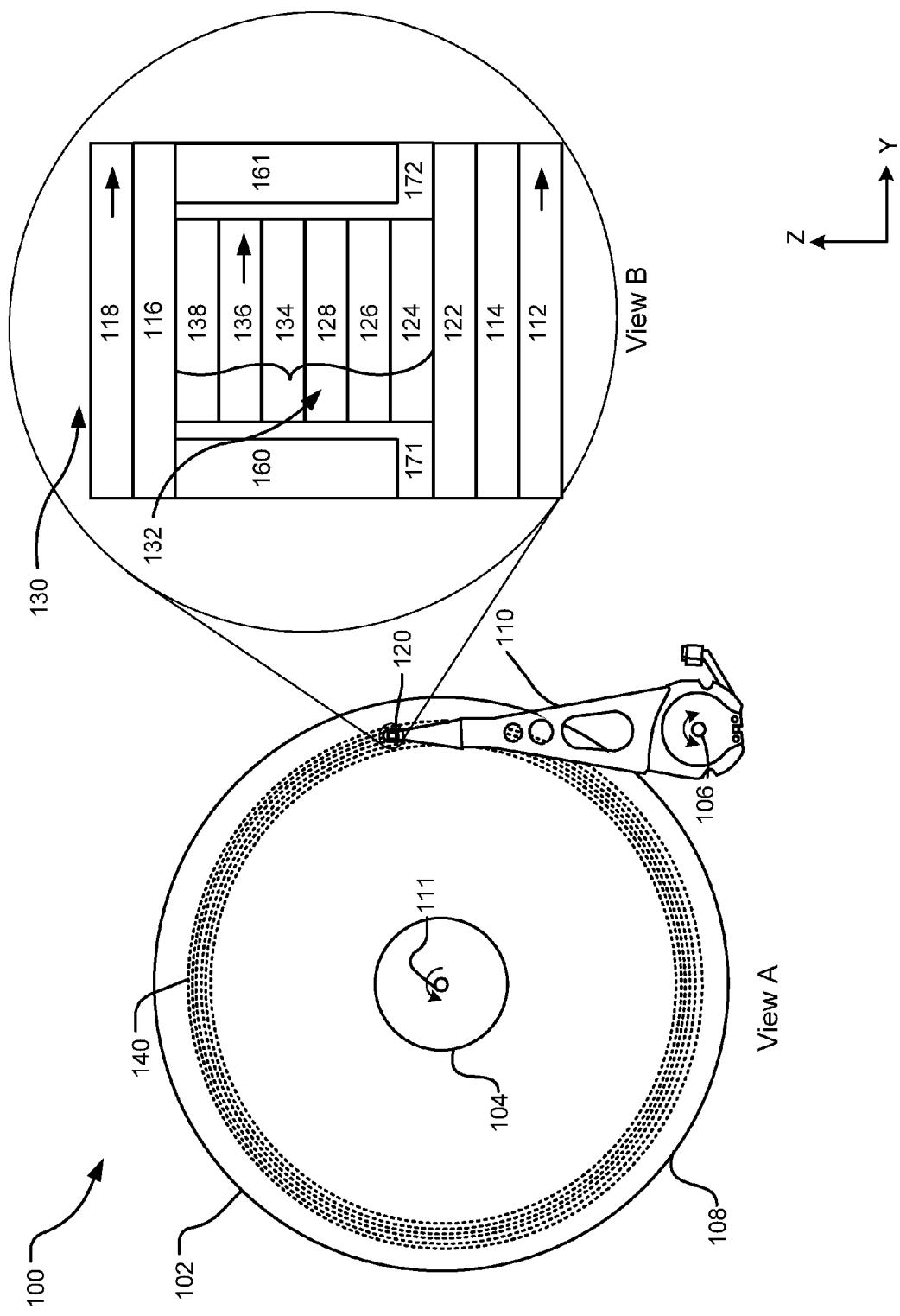
FIG. 1 illustrates a plan view of an example disk drive assembly and an exploded air-bearing surface-facing view of an example magnetoresistive sensor stack configured between an ex situ top synthetic antiferromagnetic (SAF) shield, an in situ bottom SAF shield, and side shields.

There is an increasing demand for high data densities and sensitive sensors to read data from a magnetic media. Giant Magnetoresistive (GMR) sensors that have increased sensitivity consist of two soft magnetic layers (a "pinned layer" and a "free layer") separated by a thin conductive, non-magnetic spacer layer. Tunnel Magnetoresistive (TMR) sensors provide an extension to GMR in which the electrons travel with their spins oriented perpendicularly to the layers across a thin insulating tunnel barrier layer.

Electrical resistance through a magnetoresistive stack in a sensor depends on the relative magnetic orientation of a free layer and a magnetic reference layer positioned in the stack. Resistance to current is at a maximum when the magnetic orientations of the two layers are antiparallel, while resistance is at a minimum when the magnetic orientations of the two layers are parallel. The magnetoresistive stack undergoes a magnetic anneal process to set magnetic orientations of the magnetic layers, where the magnetic field is applied perpendicular to an air-bearing surface (ABS) direction. After the anneal process, the easy axis (substantially in the direction of anisotropy) of free layer is directed toward the ABS direction, and the magnetic reference layer and the pinned layer are positioned antiparallel perpendicular to the ABS direction.

In the sensor stack, an antiferromagnetic (AFM) material may be placed adjacent to the first soft magnetic layer, the "pinned layer," to prevent the pinned layer (and in particular, its magnetization) from rotating. The magnetization is thereby fixed in a predetermined direction. The magnetization of the second soft magnetic layer, the "free layer," rotates freely in response to an external field. The sensor may also include several other layers.

Using the AFM/pinned layer structure increases the shield-to-shield spacing (SSS) of the reader. As the pulse width PW50 of magnetic sensors, which determine the signal-to-noise (SNR) ratio in a recording system, depends on the SSS of the header, achieving a lower SSS reduces the SNR of the recording system.

An example of the relationship between the PW50 and SSS, as suggested by both modeling and experiments can be given as follows: $\Delta PW50 \cong 0.3 * \Delta SSS$. Thus, a reduction in the SSS leads to reduction in the value of the PW50 and therefore, an increase in the value of the SNR for the recording system. Thus, higher linear density of the reader can be achieved by reducing the SSS. Furthermore, smaller SSS also improves the cross-track resolution of the media reader and such reduction in cross-track resolution contributes to further improvement of the areal density that can be achieved by the media reader.

As the size of magnetoresistive devices decreases, variation in the magnetization direction of the pinned layer increases. A seed layer may be used to promote the texture and the grain growth of the AFM layer. The seed layer, selected for its atomic structure or arrangement, corresponds with a preferred crystallographic direction of the AFM and magnetic layers. The seed layer may be non-magnetic material (e.g., Ta, Ru, Cr, Pt, Pd) or an alloy (e.g., NiCr). The seed layer may also be a magnetic material (e.g, NiFe), which can further enhance the exchange bias field between the AFM and pinned magnetic layers. The magnetic orientation of the magnetic seed layer is pinned perpendicular to an ABS direction, the same direction as the pinned layer.

During the reading of the reader head flying above a recording medium, the magnetic moment of a magnetic seed layer, however, may flip-flop under the stray field out of a recording medium and cause undesired domain movements for both shield magnetic layer underneath and sensor magnetic layers in the upper part of the stack. These undesired domain movements may lead to drive instability issues. A magnetoresistive stack may be configured between shields made of soft magnetic materials (e.g., NiFe or CoNiFe), which may have low magnetic anisotropy (Hk).

The sensor structure disclosed herein provides for reduced SSS and introduces high magnetic anisotropy for a reader. Specifically, the sensor structure includes a top shield, which includes a top shield SAF layer, and a bottom shield, which includes a bottom shield SAF layer. The top shield SAF layer may be ex situ and the bottom shield SAF layer may be in situ. "In situ" refers to in situ deposition, or deposition with the magnetoresistive stack without breaking vacuum. "Ex situ" refers to ex situ deposition, or deposition after broken vacuum following deposition of the magnetoresistive stack.

Furthermore, the top shield SAF layer and the bottom shield SAF layer have high magnetic anisotropy, which improves the stability of the shields and allows for reducing shield-to-shield spacing. Additionally, the bottom shield SAF layer acts as a seed layer and promotes crystal texture growth and controls grain sizes to enhance the exchange bias field between the AFM and pinned magnetic layers. A magnetoresistive stack positioned between the top shield including a top shield SAF layer and bottom SAF shield including a bottom shield SAF layer may comprise of a free layer, a barrier layer, a magnetic reference layer, a coupling spacer layer, a magnetic pinned layer, and an antiferromagnetic layer.

The magnetic moment of the disclosed sensor structure responds linearly to the stray field of any direction coming out of the recording medium. The top, bottom, and side shields absorb the stray field without interference in the magnetic orientations of the free layer, magnetic reference layer, and the magnetic pinned layer of the sensor stack. The high magnetic anisotropy of the top shield SAF layer and the bottom shield SAF layer, as well as the side shields magnetically connected with top shield SAF layer, provides domain stability for the reader head. Additionally, the SAF layers in the top shield and the bottom shield form part of the shield structure, which allows reducing SSS. Furthermore, the in situ SAF layer in the bottom shield functions as a seed layer, which promotes crystal texture growth of the AFM layer located above the bottom shield and controls grain sizes of the AFM layer located above the bottom shield, resulting in enhanced exchange bias field between the AFM layer and pinned magnetic layers of the sensor stack. The SAF layers in the top shield and the bottom shield also reduces Barkhausen noise created by domain wall movement within shields.

The bottom and top SAF shields form part of the shield structure and reduce shield-to-shield spacing (SSS). The decreased SSS leads to decreased PW50 and therefore, increase in the linear density capability of the reader. Furthermore, decreasing the SSS also improves the cross-track resolution of the reader and thus improves the areal density capability of the reader.

FIG. 1 illustrates a plan view of an example disk drive assembly 100. The example disk drive assembly 100 includes a slider 120 on a distal end of an actuator arm 110 positioned over a media disk 108. A rotary voice coil motor that rotates about an actuator axis of rotation 106 is used to position the slider 120 on a data track (e.g., a data track 140) and a spindle motor that rotates about disk axis of rotation 111 is used to rotate the media disk 108. Referring specifically to View A, the media disk 108 includes an outer diameter 102 and an inner diameter 104 between which are a number of data tracks, such as the data track 140, illustrated by circular dotted lines.

The slider 120 is a laminated structure with a variety of layers performing a variety of functions. The slider 120 includes a writer section (not shown) and one or more MR sensors for reading data off of the media disk 108.

View B in FIG. 1 illustrates a side of an example MR sensor 130 that faces an ABS of the media disk 108 when the disk drive assembly 100 is in use. Thus, the MR sensor 130 shown in View B may be rotated by about 180 degrees about (e.g., about a z-axis) when operationally attached to the slider 120 shown in View A.

In the down-track direction (z-direction), a sensor stack 132 is positioned between the following shield elements: a bottom shield 114 including an in situ SAF layer (also referred to as the in situ bottom SAF shield 114) and a top shield 116 including an ex situ SAF layer (also referred to as the ex situ top SAF shield 116). The ex situ top SAF shield 116 is formed after forming magnetoresistive junction, deposition insulators 171 and 172 and side shields 160 and 161.

The in situ bottom SAF shield 114 is positioned next to an exterior bottom shield 112 and the ex situ top SAF shield 116 is positioned next to an exterior top shield 118. The in situ bottom SAF shield 114 is formed as part of forming the sensor stack 132. In other words, the in situ bottom SAF shield 114 is formed when other layers of the sensor stack 132 are being formed without breaking vacuum, which provides a better integration of the in situ bottom SAF shield 114 with the sensor stack 132. The shield elements isolate the sensor stack 132 from electromagnetic interference, primarily z-direction interference, and serve as electrically conductive first and second electrical leads connected to processing electronics (not shown).

In operation, a bit along a track 140 on the media disk 108 consecutively passes under the exterior bottom shield 112, the in situ bottom SAF shield 114, under the sensor stack 132, the ex situ top SAF shield 116, and then under the exterior top shield 118. Therefore, the edge of the sensor stack 132 proximal to the exterior bottom shield 112 may be referred to as the "leading edge" of the sensor stack and the edge of the sensor stack 132 proximal to the exterior top shield 118 may be referred to as the "trailing edge" of the sensor stack.

The sensor stack 132 has a plurality of layers that perform a plurality of functions. In various implementations, the functionality and number of such layers may vary. In one implementation, the sensor stack 132 includes a magnetic layer with a magnetic moment that is free to rotate in response to an applied magnetic field (i.e., a free layer). The data bits on the media disk 108 are magnetized in a direction normal to the plane of FIG. 1, either into the place of the figure, or out of the plane of the figure. Thus, when the MR sensor 130 passes over a data bit, the magnetic moment of the free layer is rotated either into the plane of FIG. 1 or out of the plane of FIG. 1, changing the electrical resistance of the MR sensor 130. The value of the bit being sensed by the MR sensor 130 (e.g., either 1 or 0) may therefore be determined based on the current flowing through the sensor stack 132.

In FIG. 1, the leading edge of the sensor stack 132 is in contact with the in situ bottom SAF shield 114, which is positioned adjacent to the exterior bottom shield 112. The sensor stack 132 includes an AFM layer 122 (positioned next to the in situ bottom SAF shield 114), a magnetic pinned layer 124, a Ru layer 126, a magnetic reference layer 128, a barrier layer (or spacer) 134, a free layer 136, and a capping layer 138 (the down-track width of the various layers within the sensor stack 132 are not shown to scale).

The pinned layer 124 has a magnetic moment that is biased by the adjacent AFM layer 122. The direction of such biasing is in a direction that is substantially antiparallel to the magnetic orientation of the reference layer 128. These antiparallel magnetic orientations are due to an antiferromagnetic coupling across the layer 126, which may be a layer of ruthenium (Ru) or other suitable Ruderman-Kittel-Kasuya-Yosida (RKKY) coupling material. The capping layer 138 is positioned adjacent to the ex situ top SAF shield 116, which is positioned adjacent to the exterior top shield 118.

The deposition insulators 171 and 172 may consist of $Al_2O_3$ or MgO which electronically insulate side shields 160 and 161 from bottom shield and magnetoresistive junction and define the sensor line width. The side shields 160 and 161 are made of a soft ferromagnetic nickel alloy (e.g., NiFe, NiFeCr, NiFeMo, NiFeW, CoNiFe and CoFeNiB). Side shields magnetically connect to the top shield SAF layer 116. The side shields 160 and 161 also provide bias field to stabilize the magnetic moments of free layer along the ABS direction.

Figures 2A, 2B:
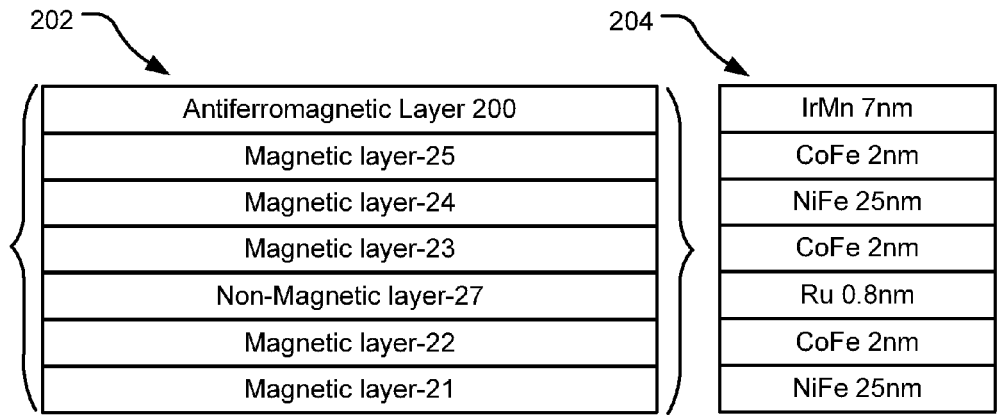

FIG. 2a illustrates an implementation of an ex situ type-1 top SAF shield 202. The magnetic layer-21 and magnetic layer-24 are made of a soft ferromagnetic nickel alloy (e.g., NiFe, NiFeCr, NiFeMo, NiFeW, CoNiFe, and CoFeNiB). These layers may have a thickness of approximately 10 nm to 50 nm. The magnetic layer-22, magnetic layer-23, and the magnetic layer-25 may comprise of a soft ferromagnetic cobalt alloy (e.g., CoFe, CoFeB, CoNiFe or CoNiFeB). These layers may have a thickness of approximately 0.5 nm to 20 nm. The non-magnetic layer-27 acts as a spacer layer. This layer may comprise of Cu, Cr, Ag, Ru, or Mo, and have a thickness of approximately 0.3 nm to 1.0 nm, which provides the antiferromagnetic coupling between the magnetic layer-22 and layer-23. The antiferromagnetic layer 200 may comprise of PtMn, IrMn, NiMn, FeMn, CrPtMn, CrIrMn, CrNiMn, or CrFeMn. This layer may have a thickness of approximately 5.0 nm to 10 nm and it pins the magnetization of magnetic layer-25 to the ABS direction.

Figure 2C:
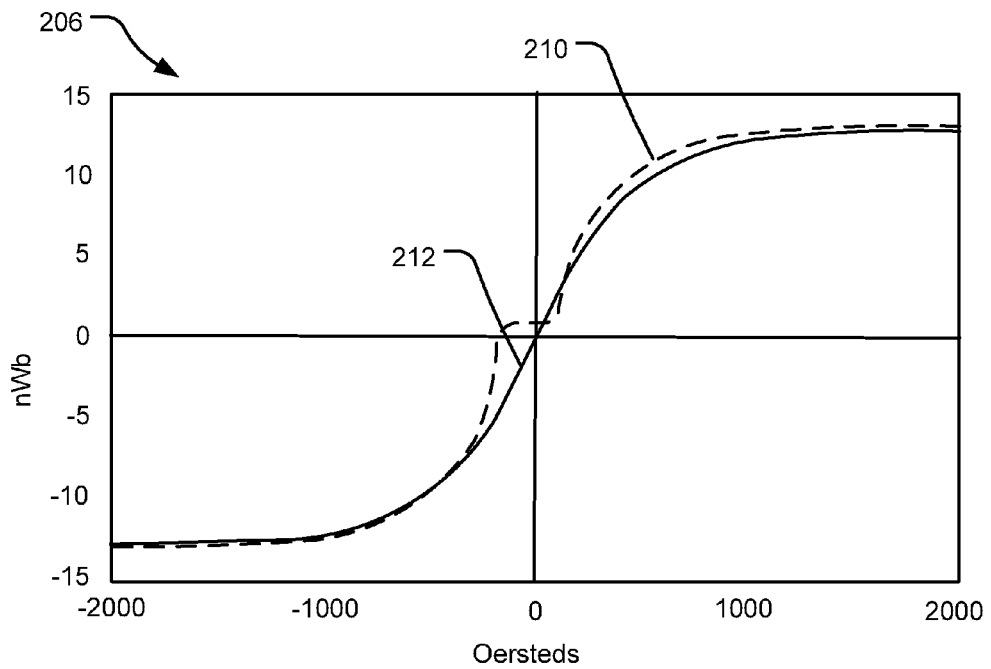
FIG. 2c illustrates a graph of the magnetization of the example ex situ type-1 top SAF shield in FIG. 2b.

FIG. 2b illustrates an ex situ type-1 top SAF shield 204 in one implementation with the following layers: NiFe 25 nm/CoFe 2.0 nm/Ru 0.8 nm/CoFe 2.0 nm/NiFe 25 nm/CoFe 2.0 nm/IrMn 7.0 nm. FIG. 2c illustrates a graph 206 including a magnetization curve (or BH Loop) 210 (shown by the dotted line) of a sensor structure including the top SAF shield along the easy axis in FIG. 2b and a magnetization curve 212 along the hard axis (substantially in the direction orthogonal to the easy axis). The graph 206 depicts values of flux density (along y-axis) against the field strength (along x-axis). The flux density (measured in nWb) increases in proportion to the field strength until it reaches a certain value where it can no longer increase and becomes constant as the field strength continues to increase (measured in Oersteds). The BH Loop 210 of FIG. 2c shows that the type-1 top SAF shield has a flat platform within a field up to 300 Oe. It can prevent undesired domain movements with the shield affected by stray field and thereby improve sensor stability. The BH loop 212 of FIG. 2c shows that the type-1 top SAF shield of FIG. 2b has a much higher magnetic anisotropy of approximately Hk~500 Oe and a hard axis saturated field (Hsat_$H_{95}$)~1100 Oe (the magnetic field along the hard axis at which 95% is saturated) than the anisotropy of a top shield including soft ferromagnetic materials (e.g., NiFe and CoFe).

Figures 3A, 3B:
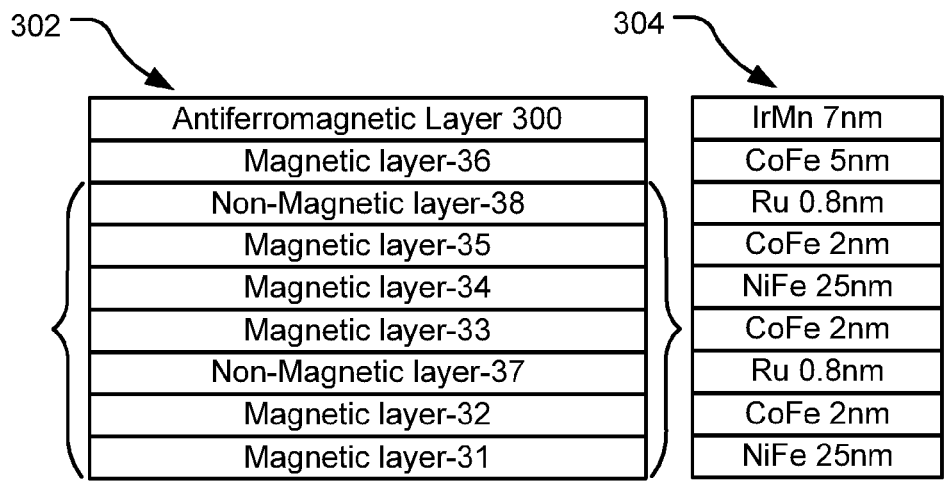

FIG. 3a shows an implementation of an ex situ type-2 enhanced top SAF shield 302. The magnetic layer-31 and layer-34 are made of soft ferromagnetic nickel alloys (e.g., NiFe, NiFeCr, NiFeMo, NiFeW, CoNiFe or CoNiFeB) with a thickness of approximately 10 nm to 50 nm. The magnetic layer-32, magnetic layer-33, magnetic layer-35, and magnetic layer-36 are made of a soft ferromagnetic cobalt layer (e.g., CoFe, CoFeB, CoNiFe and CoNiFeB) with a thickness of 0.5 nm to 20 nm. The non-magnetic layer-37 and layer-38 are space layers made of a metal (e.g., Cu, Cr, Ag, Ru, or Mo) with a thickness of approximately 0.3 nm-1.0 nm, which provides the antiferromagnetic coupling between magnetic layer-32 and layer-33 and between magnetic layer-35 and layer-36. The antiferromagnetic layer 300 is made of PtMn, IrMn, NiMn, FeMn, CrPtMn, CrIrMn, CrNiMn, or CrFeMn with a thickness of approximately 5.0 nm to 10 nm, which pins the magnetization of the top SAF shield towards an ABS direction.

FIG. 3b illustrates an ex situ type-2 top SAF shield 304 in one implementation with NiFe 25 nm/CoFe 2.0 nm/Ru 0.8 nm/CoFe 2.0 nm/NiFe 25 nm/CoFe 2.0 nm/Ru 0.8 nm/CoFe 5 nm/IrMn 7 nm.

Figure 3C:
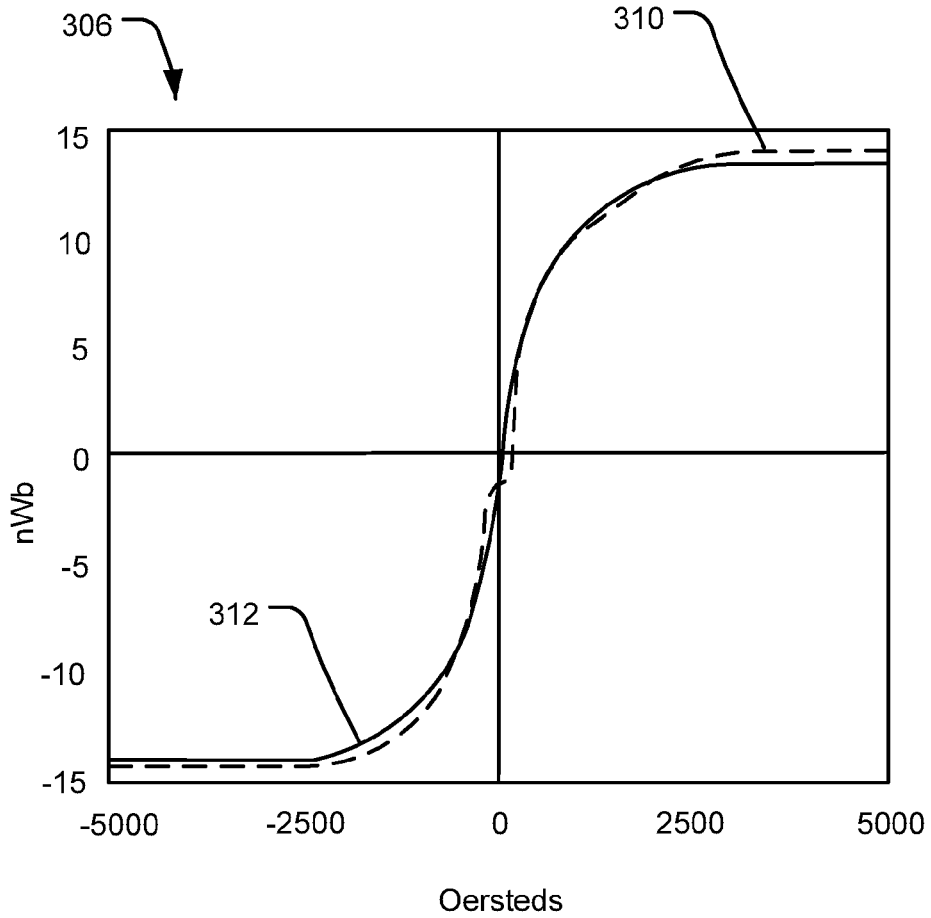
FIG. 3c illustrates a graph of the magnetization of the example ex situ type-2 enhanced top SAF shield in FIG. 3b.

FIG. 3c illustrates a graph 306 including a BH loop 310 (dotted line) of the ex situ type-2 top SAF shield along easy axis in FIG. 3b and a BH loop 312 along hard. The BH Loop 310 of FIG. 3c shows that type-2 top SAF shield has flat platform within up to 300 Oe. It can prevent undesired domain movements with shield affected by stray field and thereby improve stability within shield. The BH loop 312 in FIG. 3c shows that the type-2 top SAF shield of FIG. 3b has a much higher magnetic anisotropy of approximately Hk~700 Oe and Hsat_H95~2100 Oe compared to the anisotropy of the top shield including soft ferromagnetic materials (e.g., NiFe and CoFe).

Figures 4A, 4B:
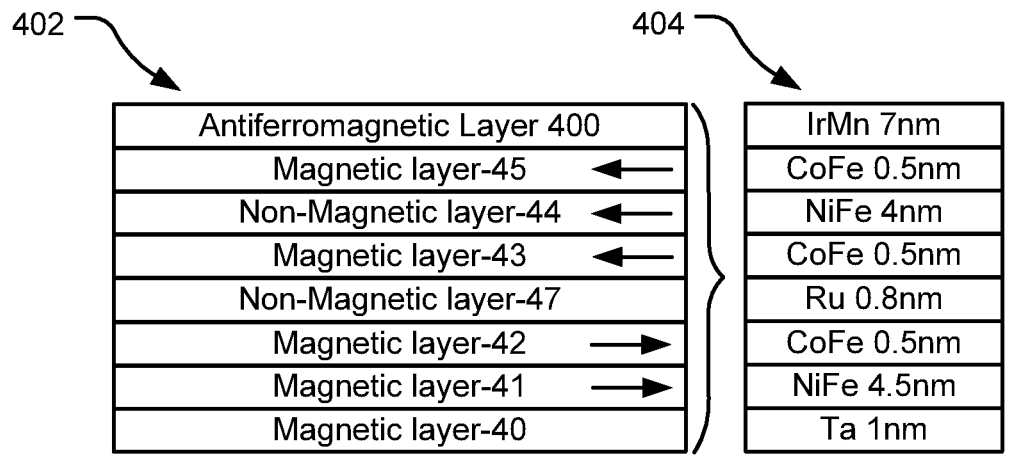

FIG. 4a illustrates an implementation of an in situ type-1 bottom SAF shield 402. The magnetic layer-41 and layer-44 layers are made of a soft ferromagnetic nickel alloys (e.g., NiFe, NiFeCr, NiFeMo, NiFeW, CoNiFe, or CoNiFeB). The magnetic layer-42, layer-43, and layer-45 may comprise of a soft ferromagnetic cobalt alloy (e.g., CoFe, CoFeB, CoNiFe or CoNiFeB). The non-magnetic layer-40 may comprise of a metal (e.g., Cu, Ag, Au, Al, Pt, Pd, Ru, Ta, Cr, or Mo) with thickness of approximately 0 nm to 3.0 nm, which promotes texture growth and control grain sizes of the above layers.

The non-magnetic layer-47 is a space layer made of a metal (e.g., Cu, Cr, Ag, Ru, or Mo) with a thickness of 0.3 nm to 1.0 nm, which provides the antiferromagnetic coupling between magnetic layer-42 and magnetic layer-43. This is also a smooth layer for the above sensor stack and controls grain size of the above AFM layer 400.

FIG. 4b illustrates an implementation of an in situ type-1 bottom shield 404 comprising Ta 1.0 nm/NiFe 4.5 nm/CoFe 0.5 nm/Ru 0.8 nm/CoFe 0.5 nm/NiFe 4.0 nm/CoFe 0.5 nm/IrMn 7.0 nm.

Figure 4C:
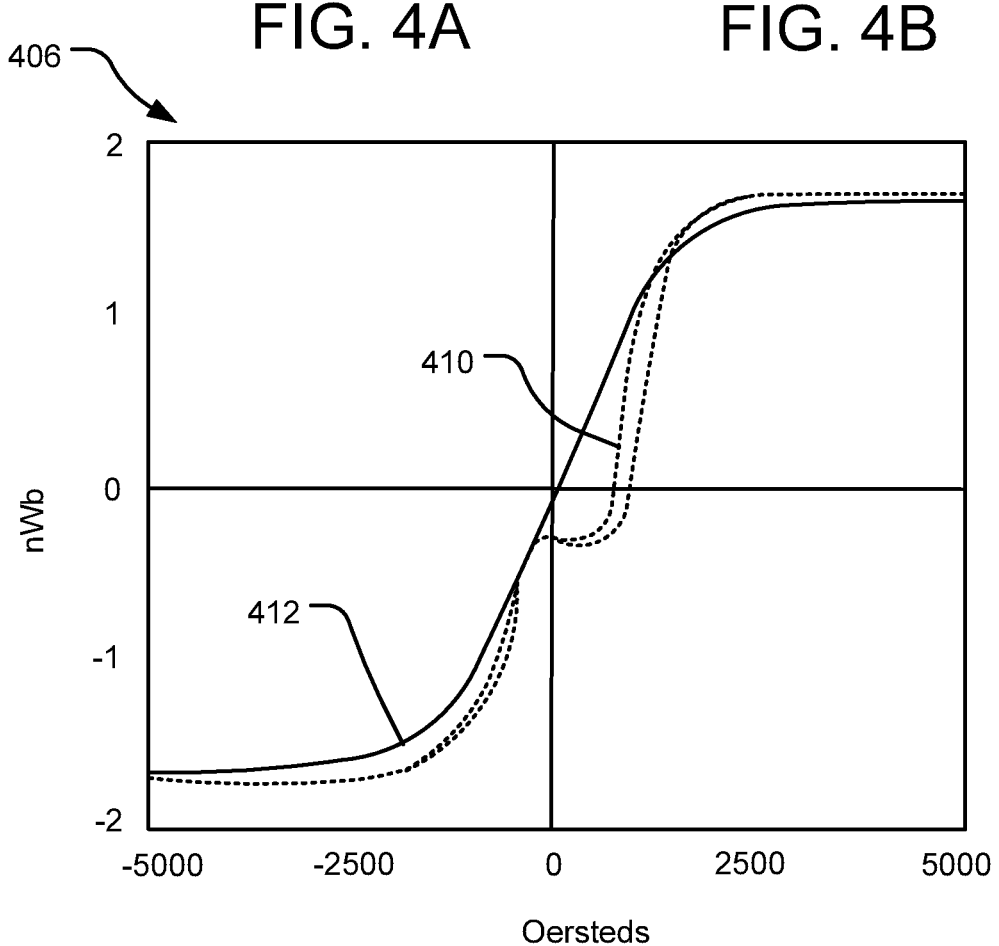
FIG. 4c illustrates a graph of the magnetization of the in situ type-1 bottom SAF shield in FIG. 4b.

FIG. 4c illustrates a graph 406 including a BH Loop 410 (dotted line) of the bottom SAF shield along easy axis in FIG. 4b and a BH loop 412 along hard axis. The BH loop 412 in FIG. 4c shows that the type-1 bottom SAF shield of FIG. 4b has a much higher magnetic anisotropy Hk of approximately 300 to 800 Oe and Hsat_H95 of 800 to 1600 Oe than an external bottom shield of soft ferromagnetic materials (e.g., NiFe or CoFe). The BH Loop 410 of FIG. 4c shows that type-1 bottom SAF shield has flat platform over 300 Oe. It can prevent undesired domain movements with shield due to stray field and thereby improve stability.

Figures 5A, 5B:
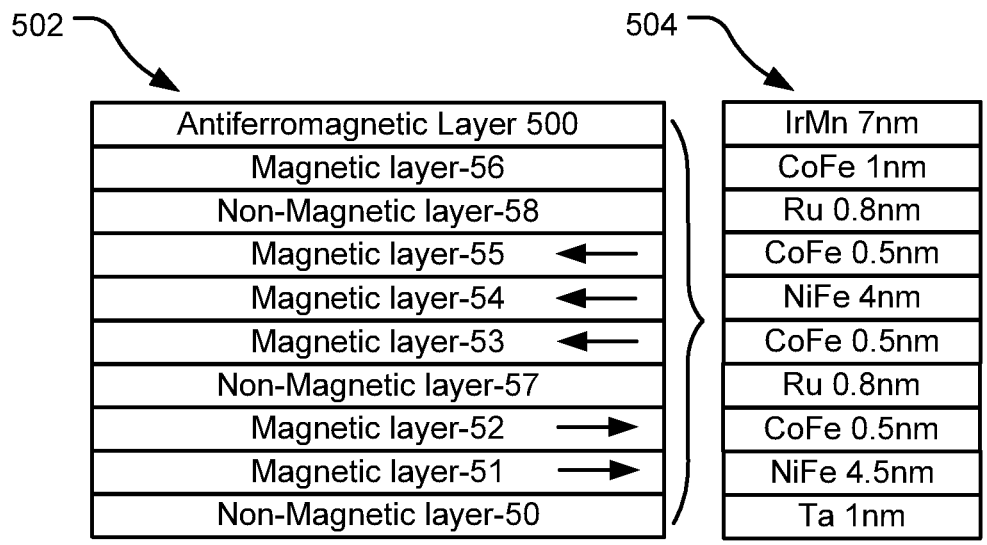

FIG. 5a illustrates an implementation of an in situ type-2 enhanced bottom SAF shield 502. The magnetic layer-51 and layer-54 layers are made of a soft ferromagnetic nickel alloy (e.g., NiFe, NiFeCr, NiFeMo, NiFeW, CoNiFe, or CoNiFeB). The magnetic layer-52, layer-53, layer-55, and layer-56, are made of a soft ferromagnetic cobalt alloy (e.g., CoFe, CoFeB, CoFeNi or CoNiFeB). The non-magnetic layer-50 layer is made of a metal (e.g., Cu, Ag, Au, Al, Pt, Pd, Ru, Ta, Cr, or Mo) with a thickness of approximately 0.0 nm to 3.0 nm, which promotes texture growth and control grain sizes of above layers. The non-magnetic layer-57 and layer-58 are space layers made of a metal (e.g., Cu, Cr, Ag, Ru, or Mo) with a thickness of approximately 0.3 nm to 1.0 nm, which provides the antiferromagnetic coupling between magnetic layer-52 and layer-53 and between magnetic layer-55 and layer-56, which is also a smooth layer for the above stack and controls grain size of above AFM layer 500.

FIG. 5b illustrates an example in situ type-2 enhanced bottom SAF shield 504 in one implementation, comprising Ta 1 nm/NiFe 4.5 nm/CoFe 0.5 nm/Ru 0.8 nm/CoFe 0.5 nm/NiFe 4.0 nm/CoFe 0.5 nm/Ru 0.8 nm/CoFe 1.0 nm/IrMn 7.0 nm.

Figure 5C:
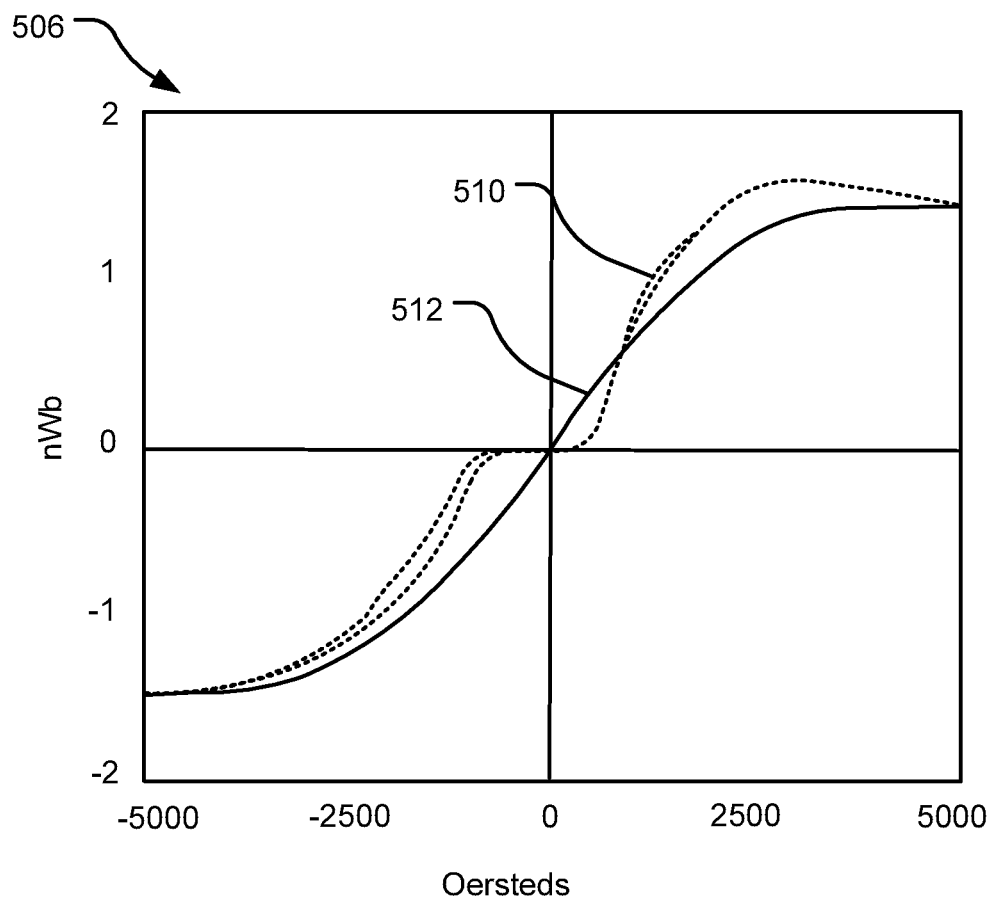
FIG. 5c illustrates a graph of the magnetization of the example in situ type-2 enhanced bottom SAF shield in FIG. 5b.

FIG. 5c illustrates a graph 506 including a BH Loop 510 of the bottom SAF shield along easy axis in FIG. 5b and a BH loop 512 along hard axis. The BH loop 512 in FIG. 5c shows that the type-2 enhanced bottom SAF shield of FIG. 5b has a much higher magnetic anisotropy of approximately Hk~2100 Oe and Hsat_H95~2900 Oe compared to the anisotropy of the a bottom shield including soft ferromagnetic materials (e.g., NiFe and CoFe). The BH Loop 510 of FIG. 5c shows that type-2 bottom SAF shield has flat platform over 300 Oe. It can prevent undesired domain movements with shield due to stray field and thereby improve stability.

Figures 6A, 6B:
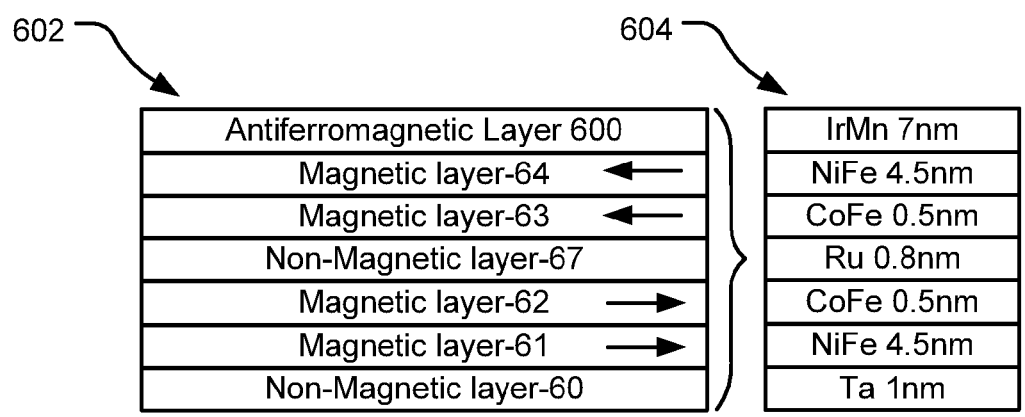

FIG. 6a illustrates an implementation of in situ type-3 bottom SAF shield 602. The magnetic layer-61 and layer-64 layers are made of a soft ferromagnetic nickel alloy (e.g., NiFe, NiFeCr, NiFeMo, NiFeW, CoFeNi, or CoNiFeB). The magnetic layer-62 and layer-63 are made of a soft ferromagnetic cobalt alloy (e.g., CoFe, CoFeB, CoFeNi, or CoNiFeB).

The non-magnetic layer-60 is made of a metal (e.g., Cu, Cr, Ag, Au, Al, Pt, Pd, Ta, Ru, or Mo) with thickness of approximately 0 nm to 3.0 nm, which promotes texture growth and grain sizes of the layers above.

The non-magnetic layer-67 is a space layer made of a metal (e.g., Cu, Ag, Ru, Cr, or Mo) with a thickness of approximately 0.3 nm to 1.0 nm, which provides the antiferromagnetic coupling between magnetic layer-62 and magnetic layer-63, which is also a smooth layer for above stack and controls grain size of the above AFM layer 600.

FIG. 6b illustrates an example of the in situ type-3 bottom SAF shield 604 of FIG. 6a in one implementation, comprising Ta 1.0 nm/NiFe 4.5 nm/CoFe 0.5 nm/Ru 0.8 nm/CoFe 0.5 nm/NiFe 4.5 nm/IrMn 7.0 nm.

Figure 7:
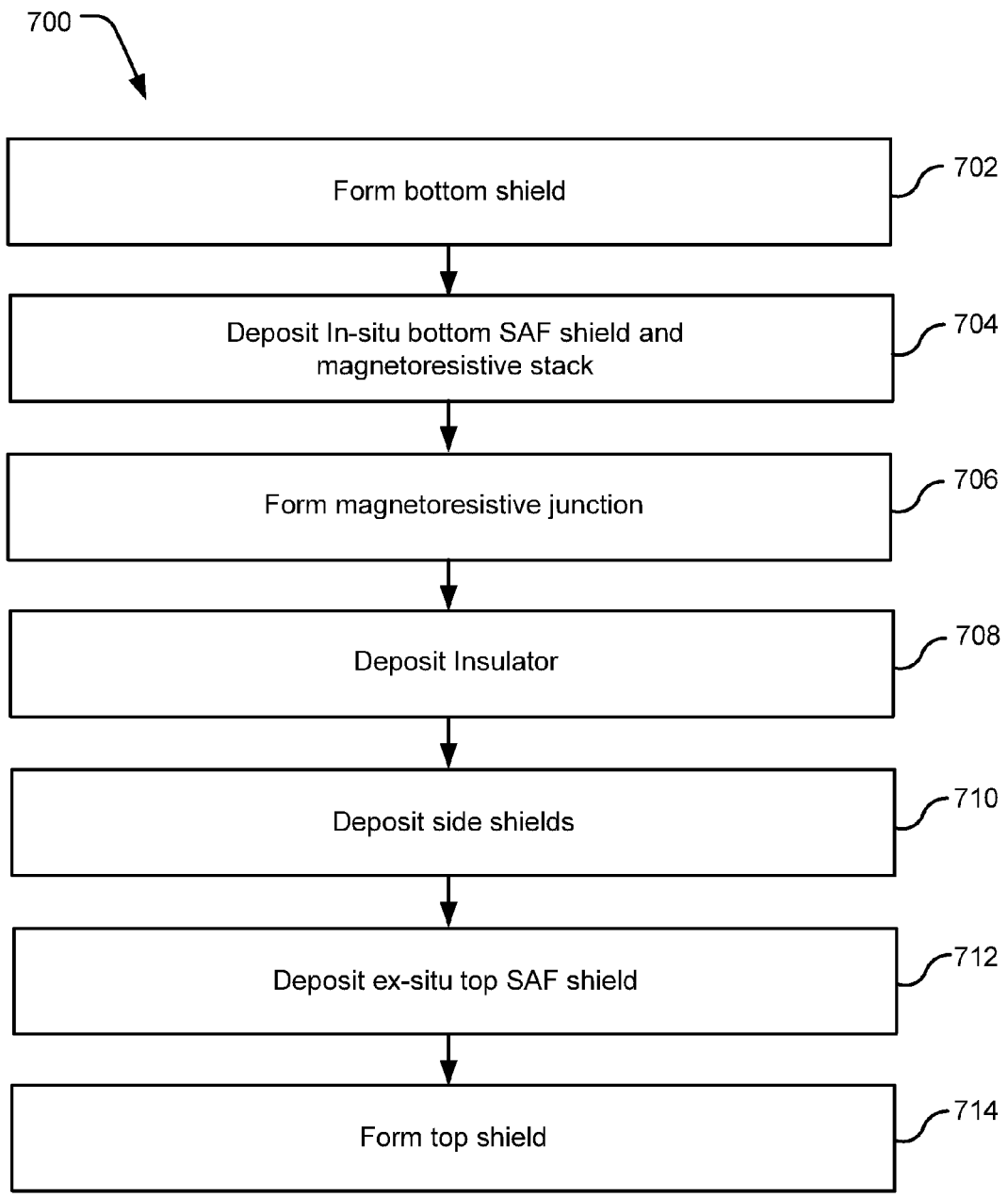
FIG. 7 illustrates example operations for magnetic element fabrication.

Referring now to FIG. 7, example operations 700 of a method for magnetic element fabrication are shown. As shown, a bottom shield is formed in a form bottom shield operation 702. In one implementation, an in situ bottom SAF shield magnetoresistive stack is deposited without breaking vacuum in a deposition operation 704. A magnetoresistive junction is then formed by milling in a formation operation 706. An insulator is deposited in a deposition operation 708. Side shields are then deposited in another deposition operation 710. An ex situ top SAF shield is deposited in a deposition operation 712. Lastly, a top shield is formed in a form top shield operation 714.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus comprising:
a sensor structure, including a top shield including a top shield synthetic antiferromagnetic (SAF) layer and a bottom shield including a bottom shield SAF layer, wherein the bottom SAF shield layer acts as a seed layer that promotes crystal texture growth of an antiferromagnetic layer with a magnetic orientation pinned perpendicular to an air-bearing surface direction.

2. The apparatus of claim 1, wherein the top SAF shield layer is an ex situ SAF layer.

3. The apparatus of claim 1, wherein the bottom SAF shield layer is an in situ SAF layer.

4. The apparatus of claim 3, wherein the in situ bottom SAF shield layer is a seed layer.

5. The apparatus of claim 1, further comprising a magnetoresistive sensor element between the top shield SAF layer and bottom shield SAF layer, the magnetoresistive sensor element comprises a free layer, a barrier layer, a magnetic reference layer, a coupling spacer, a magnetic pinned layer, and an antiferromagnetic layer.

6. The apparatus of claim 1, wherein the top shield SAF layer is an ex situ SAF layer and the bottom shield SAF layer is an in situ SAF layer, the in situ bottom shield SAF layer being a seed layer.

7. The apparatus of claim 6, further comprising an antiferromagnetic layer of a polycrystalline composition adjacent to the bottom shield SAF layer.

8. The apparatus of claim 7, wherein the antiferromagnetic layer includes at least one of platinum and manganese.

9. The apparatus of claim 1, wherein the top shield SAF layer further comprises layers of at least one of nickel alloys and cobalt alloys.

10. The apparatus of claim 1, wherein the bottom shield SAF layer further comprises layers of at least one of nickel alloys and cobalt alloys.

11. An apparatus comprising:
a sensor structure, including a top shield including a top shield synthetic antiferromagnetic (SAF) layer and a bottom shield including a bottom shield SAF layer, the top shield SAF layer is an ex situ top shield SAF layer and the bottom shield SAF layer is an in situ bottom shield SAF layer, wherein the bottom SAF shield layer acts as a seed layer that promotes crystal texture growth of an antiferromagnetic layer with a magnetic orientation pinned perpendicular to an air-bearing surface direction.

12. The apparatus of claim 11, wherein the top shield SAF layer has magnetic anisotropy Hk greater than 300 Oe.

13. The apparatus of claim 12, wherein the bottom shield SAF layer has magnetic anisotropy Hk greater than 300 Oe.

14. A magnetoresistive (MR) sensor comprising:
an MR stack configured between a top shield and bottom shield along a down-track direction;
a top shield synthetic antiferromagnetic (SAF) layer configured in the top shield; and a bottom shield SAF layer configured in the bottom shield, wherein the bottom SAF shield layer acts as a seed layer with a magnetic orientation pinned perpendicular to an air-bearing surface direction.

15. The MR sensor of claim 14, wherein the top shield SAF layer is configured using an ex situ process.

16. The MR sensor of claim 14, wherein the bottom shield SAF layer is configured using an in situ process.

17. The MR sensor of claim 14, wherein anisotropy Hk of the top shield SAF layer is greater than 300 Oe.

* * * * *